United States Patent
Chiu et al.

(10) Patent No.: US 8,041,079 B2
(45) Date of Patent: Oct. 18, 2011

(54) APPARATUS AND METHOD FOR DETECTING OBSTACLE THROUGH STEREOVISION

(75) Inventors: Chung-Cheng Chiu, Taoyuan County (TW); Meng-Liang Chung, Taoyuan County (TW); Wen-Chung Chen, Taoyuan County (TW); Min-Yu Ku, Taoyuan County (TW)

(73) Assignee: National Defense University, Taoyuan County (TW)

( * ) Notice: Subject to any disclaimer, the term of this patent is extended or adjusted under 35 U.S.C. 154(b) by 931 days.

(21) Appl. No.: 12/023,700

(22) Filed: Jan. 31, 2008

(65) Prior Publication Data

US 2008/0285799 A1    Nov. 20, 2008

(30) Foreign Application Priority Data

May 16, 2007    (TW) ............................... 96117494 A

(51) Int. Cl.
*G06K 9/00*    (2006.01)
(52) U.S. Cl. ....................................... 382/104; 382/103
(58) Field of Classification Search .................. 382/100, 382/103, 104, 107, 154, 190, 195, 219, 224–226, 382/249, 278, 284; 250/336.1, 338.1, 339.02; 340/425.5, 435, 436, 901–903, 933, 937; 342/52, 64, 95; 345/418–419, 611, 630; 348/148, 169, 207.99, 208.99, 208.12, 211.11, 348/700; 701/300–301

See application file for complete search history.

(56) References Cited

U.S. PATENT DOCUMENTS

| | | | |
|---|---|---|---|
| 6,263,088 B1 * | 7/2001 | Crabtree et al. | 382/103 |
| 7,764,808 B2 * | 7/2010 | Zhu et al. | 382/104 |
| 2003/0095133 A1 | 5/2003 | Chiu et al. | |
| 2004/0234136 A1 * | 11/2004 | Zhu et al. | 382/224 |
| 2006/0013439 A1 | 1/2006 | Takeda et al. | |
| 2006/0182312 A1 | 8/2006 | Nakai et al. | |
| 2006/0197019 A1 | 9/2006 | Satou | |
| 2008/0273751 A1 * | 11/2008 | Yuan et al. | 382/103 |
| 2011/0025548 A1 * | 2/2011 | Nickolaou | 342/52 |

FOREIGN PATENT DOCUMENTS

| | | |
|---|---|---|
| TW | 406009 | 9/2000 |
| TW | 200604959 A | 2/2006 |
| TW | I251661 | 3/2006 |
| WO | 9718523 A2 | 5/1997 |

* cited by examiner

*Primary Examiner* — Samir Ahmed
*Assistant Examiner* — Mehdi Rashidian
(74) *Attorney, Agent, or Firm* — Apex Juris, pllc; Tracy M. Heims

(57) ABSTRACT

According to an apparatus and method for detecting an obstacle through stereovision, an image capturing module comprises a plurality of cameras and is used for capturing a plurality of images; an image processing module edge-detecting the image to generate a plurality of edge objects and object information corresponding to each edge object; an object detection module matches a focus and a horizontal spacing interval of the camera according to the object information to generate a relative object distance corresponding to each edge object; a group module compares the relative object distance with a threshold distance and groups the edge objects with the relative object distance smaller than the threshold distance to be an obstacle and obtains a relative obstacle distance corresponding to the obstacle.

20 Claims, 10 Drawing Sheets

APPARATUS AND METHOD FOR DETECTING OBSTACLE THROUGH STEREOVISION

CROSS-REFERENCES TO RELATED APPLICATIONS

This non-provisional application claims priority under 35 U.S.C. §119(a) on Patent Application No(s). 096117494 filed in Taiwan, R.O.C. on 2007 May 16, the entire contents of which are hereby incorporated by reference.

FIELD OF INVENTION

The present invention relates to an apparatus and method for detecting an obstacle, and more particularly to an apparatus and method for detecting an obstacle through stereovision.

BACKGROUND OF THE INVENTION

Accompanying the technology progressing of car industry, more and more intelligent vehicles are developed. A car is facilitated with a plurality of intelligent devices, for example, obstacle detecting device, distance detecting device and etc. A warning signal is emitted appropriately to bring the attention of a driver through these devices in a certain specific state such as being too close to an obstacle or deviating from a car lane and hence, car accidents and damages caused therefore can be reduced substantially. Therefore, more and more car factories stress on the research and development of an intelligent transportation system (ITS) and include it as a standard equipment in a new car.

A traditional obstacle detection apparatus comprises multiple forms, for example, radar type, monocular camera, infrared ray or infrared heat image. As a radar type, infrared line or infrared heat image facility is rather expensive, the required cost is also higher. The research of an image processing is progressing more and more such that adopting a camera to capture images and further assisting follow-up image processing, the obstacle detection can be done; this not only fills the bill on technology but also attains to the consideration of the cost reduction.

However, the current monocular camera image detection system developed up to now still has drawbacks expected to improve; that is the distance estimation error caused by shock or angle change cannot be broken through. For example, a general monocular camera image detection system can only be applied on a smooth road but not on an uphill road, downhill road, crooked road or bumpy road because the serious judgment error might be caused owing to the shock and the angle change.

Therefore, for improving the drawbacks generated from the monocular camera, a double-camera image detection system is proposed. Although, the double-camera image detection system allows a captured image to be more stereo to improve the insufficiency of the monocular camera system, new problems are also arisen. The processing time of the double-camera detection system is double the processing time of the monocular camera detection system such that the time spent on calculation is also double. Thus, when a car is practically driven on a road, because the real-time captured image data amount is too large, the relating information (distance or shape) of a preceding obstacle (person, car or electric pole) cannot be calculated immediately to provide a driver with a warning. Furthermore, the same exposure timings cannot be sure owing to the multiple camera sets of independent formation of image such that specific hardware, e.g. image capturing processing card, is always needed to include between the cameras to allow the exposure timings thereof to be set synchronous or a synchronous camera set is directly adopted. Here, a synchronous resolution is to adopt line segments detection between the same-level zone from a left image to a right image; this is a line to line detection. However, a general low-cost camera cannot attain to the synchronous image capturing such that the left and right image pairs captured by the left and right cameras will also be formed at different heights even if it is the same horizontal line segment. But, the cost of adopting the synchronous cameras or increasing the hardware is always more expansive than a general camera and hence, the whole cost is caused to increase.

SUMMARY OF THE INVENTION

For improving the deficits mentioned above, the present invention proposes an apparatus and method for an obstacle through stereovision; it uses a plurality of cameras to capture images to generate stereovision to solve the drawbacks generated by using a monocular camera to capture images. Besides, the improvement of an image processing module or algorithm can reduce the calculation time spent on image processing and attain to a real-time detection of an obstacle. Furthermore, even if the images captured between the plurality of cameras are not synchronous, but the problems generated from the traditional asynchronous image detection can be solved by means of the apparatus and method proposed by the present invention to attain to the effect similar to the synchronous system. Therefore, a general low-cost camera can be adopted in the present invention and the cost can be substantially reduced.

The present invention proposes an apparatus for detecting an obstacle through stereovision comprising an image capturing module provided with a plurality of cameras used for capturing a plurality of images. The image is detected by an edge detection of the image processing module to generate a plurality of edge object and object information corresponding to each edge object. An object detection module generates a relative object distance corresponding to each edge object by matching the horizontal and vertical line segments of the two cameras in a plurality of cameras according to the object information. A group module compares the relative object distance with a threshold distance, groups the edge object with the relative object distance smaller than the threshold distance to be an obstacle and obtains a relative obstacle distance corresponding to the obstacle.

The present invention also proposes a method for detecting an obstacle through stereovision comprising the follow steps: capturing a plurality of images through a plurality of cameras; detecting the images by an edge detection to generate a plurality of edge object and object information corresponding to each edge object; matching the horizontal and vertical line segments of the two cameras in a plurality of cameras to generate a relative object distance corresponding to each edge object according to the object information; comparing the relative object distance with a threshold distance; grouping the edge objects with the relative object distance smaller than the threshold distance to be an obstacle and obtaining an relative obstacle distance corresponding to the obstacle.

BRIEF DESCRIPTION OF THE DRAWINGS

The present invention can be more fully understood by reference to the following description and accompanying drawings, in which.

DESCRIPTION OF PREFERRED EMBODIMENTS

Figure 1:
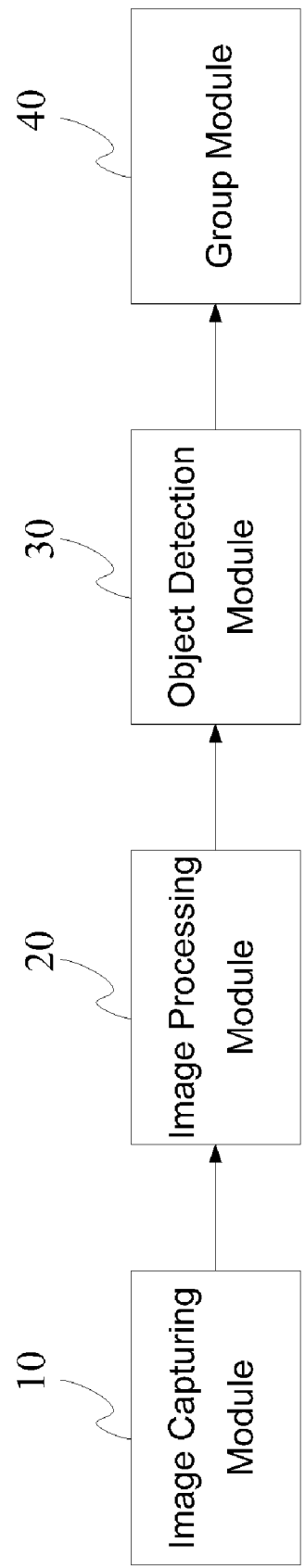
FIG. 1 is a block diagram of an apparatus for detecting an obstacle through stereovision of the present invention.

Please refer to FIG. 1. FIG. 1 is a block diagram of an apparatus for detecting an obstacle through stereovision of the present invention. An apparatus for detecting an obstacle through stereovision comprises an image capturing module 10, image processing module 20, object detection module 30 and group module 40.

The image capturing module 10 comprises a plurality of cameras used for capturing a plurality of images. The following will take two cameras as an example to describe. But, the number of the cameras is not limited to two. The reason for adopting the plurality of cameras to capture images mainly is because if only one camera is adopted, the captured images cannot attain to the stereovision effect such that the misjudgment of a detection distance is easily caused owing to shock or the change of angle. Hence, the plurality of cameras are similar to human eyes, left and right eyes capture images and the captured images can generate stereovision through the processing of human brain. Therefore, in the image capturing module 10, the number of the cameras can be two for one set, and at least one set of the image capturing module 10 is mounted on a vehicle depending on requirement. For example, multiple sets of cameras may be adopted on a larger vehicle (e.g. town bus, truck or city bus) to capture the multiple sets of images simultaneously to detect the obstacle in many directions to prevent blind spots from being generated.

Figure 2:
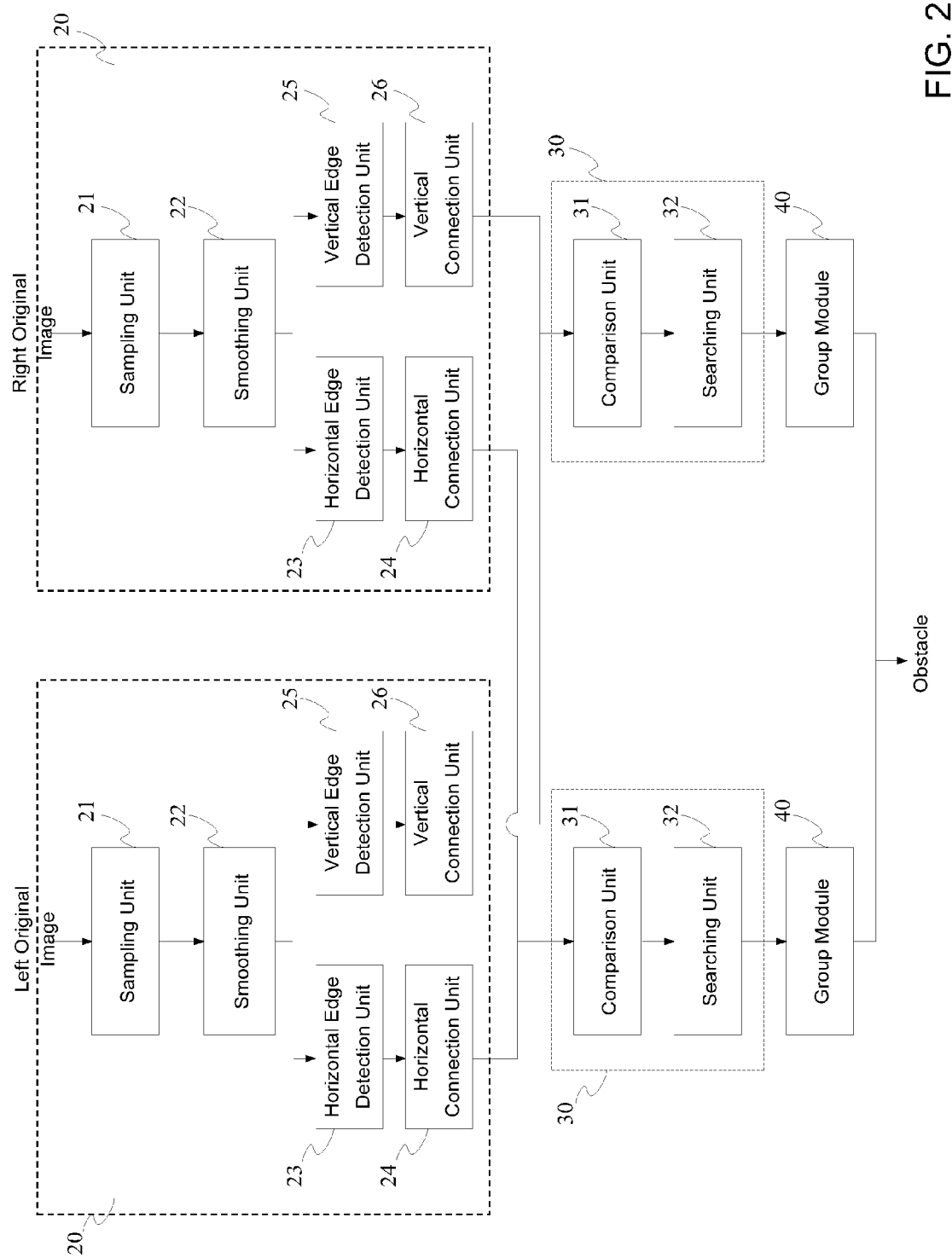
FIG. 2 is a detailed block diagram of an apparatus for detecting an obstacle through stereovision of the present invention.

Please refer to FIG. 2. FIG. 2 is a detailed block diagram of an apparatus for detecting an obstacle through stereovision of the present invention. As the figure shows, the image processing module 20 comprises a sampling unit 21, smoothing unit 22, horizontal edge detection unit 23, horizontal connection unit 24, vertical edge detection unit 25 and vertical connection unit 26.

The image capturing module 10 having two cameras at left and at right is taken as an example to describe as the following. The left and the right cameras respectively capture left and right image pairs. In order to decrease the processing time, the input image pairs will be down sampled by a factor of 2n to obtain multi-resolution images. The resolution of the left and right image pairs are decreased via the sampling unit by means of decimation. An action executed by the sampling unit 21 is down sampling; the image is scanned respectively in vertical and horizontal directions by means of decimation to output a low-resolution image. Thereafter, the operation amount of the image processing amount can be reduced greatly by means of the action of the down sampling of the sampling unit 21.

The smoothing unit 22 carries out a low pass filtering procedure on the image processed by the sampling unit 21 to eliminate electronic and optical noise and thereby getting rid of high frequency characteristic of the image to elevate the edge detection effect thereafter. Next, the horizontal edge detection and the vertical edge detection are executed. The horizontal edge detection unit 23 uses an edge detection operator to detect the image to generate horizontal line segments, in which the edge detection operator is an operator in the image processing and mainly used for the edge detection of the image; technically, it is a diffusing difference operator and used for operating an approximate gradient value of an image illumination function. A corresponding gradient vector or a normal vector thereof will be generated at any point of the image by using this operator. Therefore, the edge detection operator is always used on the edge detection of an image or picture to allow the edge characteristic of the image to be drawn out. After the horizontal line segments of the image are generated through the horizontal edge detection unit 23, the horizontal connection unit 24 connects the horizontal line segments to form a horizontal bounding box by means of 8-connection. Thereafter, object information such as coordinate values of left and right ends of each horizontal bounding box and an image dot number can be output after being processed through the horizontal connection unit 24.

Similarly, the vertical edge detection unit 25 also uses the edge detection operator to detect the image to generate vertical edge segments. The vertical connection unit 26 connects the vertical line segments to form a vertical bounding box. Thereafter, object information such as coordinate values of left and right ends of each vertical bounding box and an image dot number can be output after being processed through the vertical connection unit 26.

Because most of the horizontal and vertical line segments will appear in the left and right images simultaneously, the horizontal and vertical line segments can be matched in each stereo image pairs. Thereupon, the image processing module 20 processes the edge detection on the image captured by the image capturing module 10 to generate the plurality of edge objects and the object information corresponding to each edge object, in which the edge object comprises the horizontal and vertical bounding boxes and the object information comprises an object coordinate value, image dot number, object length, object width and etc.

Next, please refer to FIG. 2 again. As the figure shows, the object detection module 30 comprises a comparison unit 31 and searching unit 32.

From the figure we can find that the comparison unit 30 may be divided into left and right comparison units 31. The left comparison unit 31 processes the object information of the horizontal bounding boxes of the left and right image pairs output from the horizontal connection unit 24 and the right comparison unit 31 processes the object information of the vertical bounding boxes of the left and right image pairs output from the vertical connection unit 26. As the images are respectively captured by the left and right cameras and factors such as different vision angles of the cameras and different light cause the left and right image pairs also to be not exactly the same. Furthermore, not each horizontal/vertical bounding box processed by the image processing module 20 belongs to the edge object (horizontal/vertical bounding boxes) of an obstacle. Therefore, the object information of the horizontal and vertical bounding boxes, e.g. the end point coordinate value and the image dot number of the bounding boxes, must be respectively compared through the comparison unit 31 and a suspect object can then be generated. The so-called suspect object means the edge object possibly belonging to an obstacle.

A comparison manner of the comparison unit 31 may adopt a method described as the following, but it is not limited to it. Suppose that the left image is a reference image, and take out each object information of all bounded boxes such as object coordinates, image dot numbers, object lengths and object widths in sequence to compare with the object information of the right image. Comparison conditions will process full comparison according to the characteristics of the double-camera stereovision and filtering conditions mainly utilize the area overlaying characteristic of stereovision to further analyze each object of the left image and each object of the right image; this is the so-called stereovision effect. Furthermore, use the proportion of the object length and the object width to filter, the object satisfies these conditions can be included in the suspect object. Because the present invention adopts the aforementioned comparison method to generate the suspect objects so that the problem of the asynchronous behavior between the multiple cameras can be overcome. Therefore, general low-cost cameras can be adopted for the multiple sets of cameras comprised in the image capturing module 10 of the present invention and it is unnecessary to adopt rather expensive synchronous cameras and need more hardware like the traditional technology does so that the cost can be substantially saved.

The searching unit 32 returns to the image to do local search according to the suspect object generated according to the comparison unit 31. After the local search is processed through the searching unit 32, what suspect objects are the real edge objects can be affirmed. The coordinate values of the edge objects of the left and right images are subtracted to each other to allow a disparity value (dx) of the edge objects to be generated; the detail will be described as the following.

The difference on illumination is always generated on the images respectively formed by the two cameras due to the difference between their shutter speeds and their diaphragm sizes; it is also to say that the average illuminations of the left and the right images are different. For eliminating this difference, the local search of taking an average difference value as a comparison base is adopted. However, in practice, because a car will object to the influence of an outer factor of lens shaking during driving, a horizontal error between the two cameras is indirectly generated. For conquering this problem, a vertical range of its search must be enlarged so as to elevate the accuracy and prevent the search error from being caused while returning to the images to do searching. Thus, the disparity value (dx) of the edge objects can be generated.

Besides, in the apparatus for detection an obstacle of the present invention, a car may be used for a carrier to allow a real time detection to be processed on a preceding obstacle when the car is driven on a road. The car is always driven with high speed to snap images such that synchronous exposure of the two cameras must be considered to prevent the formation timing of the left and right image from being caused to vary due to an image capturing time difference between the two cameras. The traditional double-camera adopting technologies all use expensive synchronous cameras to control and capture images so as to prevent the aforementioned problems from being generated. But, the present invention can use low-cost cameras by means of the technical assistance of aforementioned comparison unit 31 and searching unit 32 to attain to the same effect as the expensive synchronous camera. Thereupon, the camera cost can be substantially reduced.

Figure 3A:
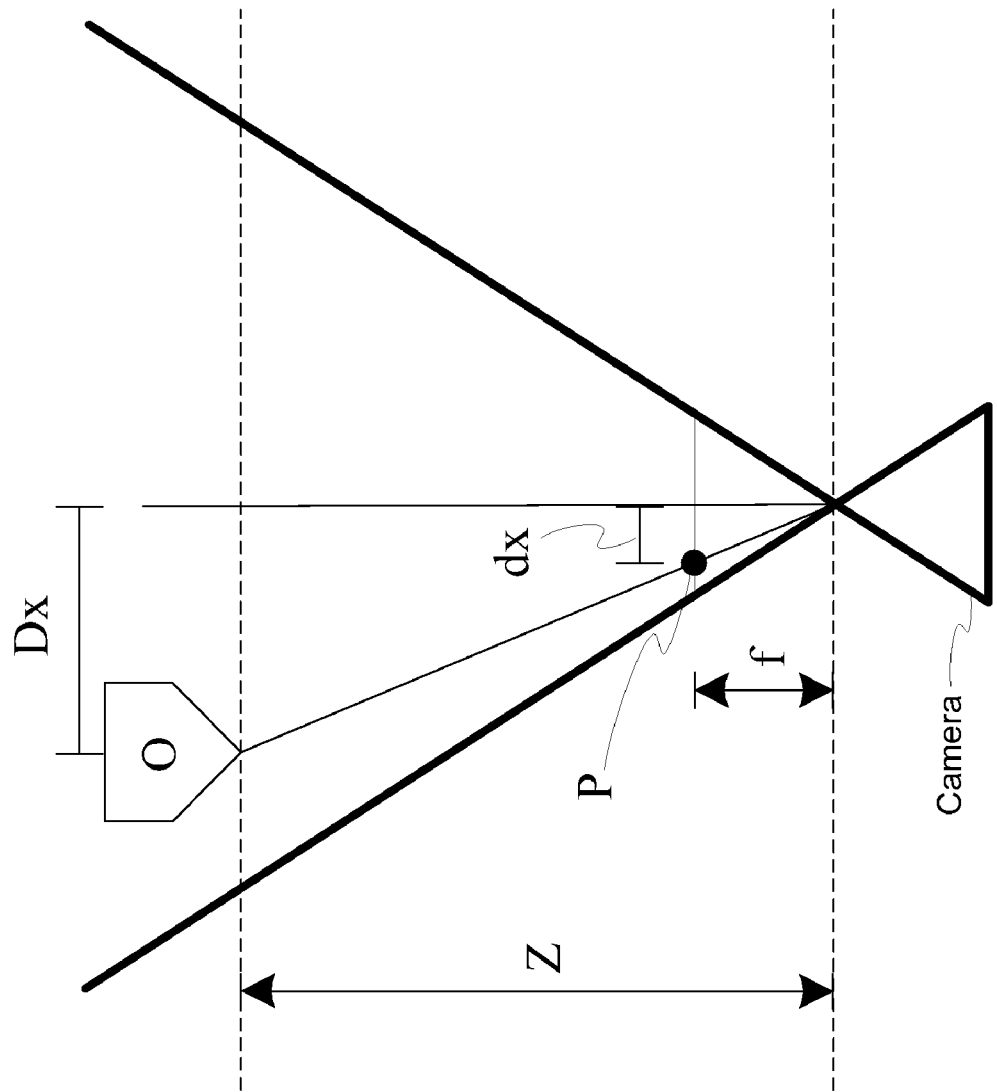
FIG. 3A is a perspective view of a monocular camera distance measurement.

Please refer to FIG. 3A first. FIG. 3A is a perspective view of distance measurement of a monocular camera. First, assigned parts numbers are described first as the following:
O: object for image capturing
P: image formation point of the object O
Dx: distance between the object O and a facies line of a vision angle
Z: relative distance between the object O and a camera
dx: distance between the image formation point P and the facies line of a vision angle
f: focus
a formula is derived as the following:

$$\frac{Z}{f} = \frac{Dx}{dx} \Rightarrow Dx = \frac{Z}{f} \times dx \qquad (1)$$

Figure 3B:
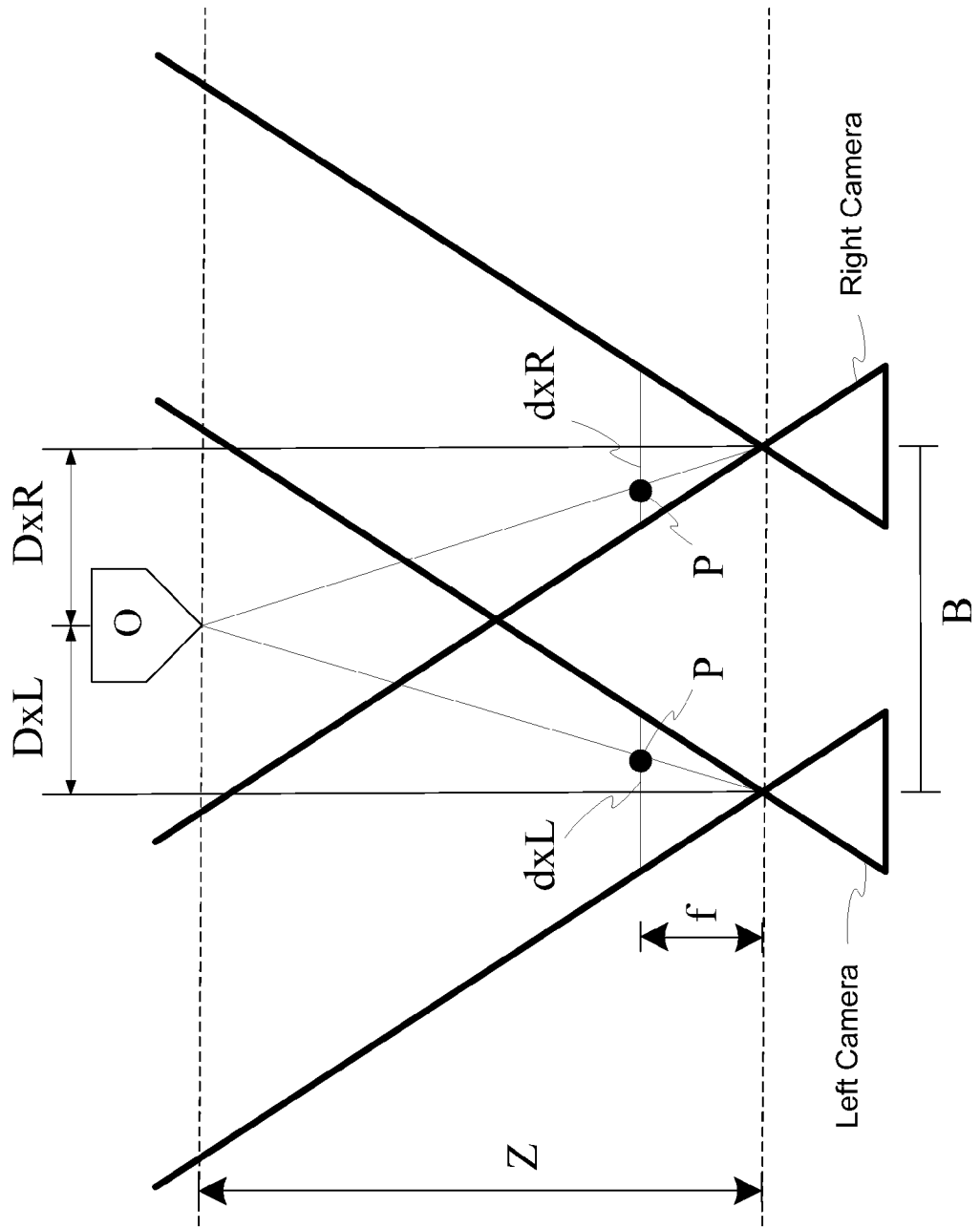
FIG. 3B is a perspective view of s stereovision distance measurement.

Please refer to FIG. 3B. FIG. 3B is a perspective view of a stereovision distance measurement. The figure is a perspective view of a double-camera distance measurement. Assigned parts numbers in the figure are first described as the following:
B: horizontal spacing interval between two cameras
DxL: distance between the object O and a facies line of vision angle of a left camera
DxR: distance between the object O and a facies line of a vision angle of a right camera
dxL: distance between the image formation point P of a left camera and the facies line of a vision angle of the left camera
dxR: distance between the image formation point P of a right camera and the facies line of a vision angle of the right camera
a formula is derived as the following:

$$B = DxL + DxR \qquad (2)$$

Substitute formula (1) into formula (2), we can obtain:

$$B = \frac{Z}{f}(dxL + dxR) = \frac{Z}{f}dx \qquad (3)$$

Therefore, from formula (3) we can obtain a relative distance Z between the object O and the cameras, and it is:

$$Z = \frac{B \times f}{dx} \qquad (4)$$

The aforementioned B is the horizontal spacing interval between the two cameras and f is the focus of the camera, and the both are all known value such that only if dx is obtained, the relative distance between the camera and the object for image capturing, i.e. the relative object distance of each edge object called in the present invention, can then be obtained. From formula (3) we can know that dx is dxL plus dxR, and we can know from FIG. 3B that dx is a value obtained subtracting a X coordinate value of the image formation point of the right camera from a X coordinate value of the image formation point of the left camera (dx=Left X−Right X).

From the description mentioned above, the object detection module 30 can generate the relative object distance (Z) corresponding to each edge object according to the object information (object coordinate value) and matching the focus (f) of the camera and the horizontal distance (B).

Please refer to FIG. 2. the group module 30 sets a threshold distance and compares the relative object distance corresponding to each edge object (respectively are horizontal/ vertical match object) generated through the object detection module 30 with the threshold distance. The purpose is to group the edge objects with very small difference in the relative object distance, i.e. the edge objects (horizontal/vertical match object) adjacent to each other, to be the same obstacle. Thus, the outlook dimension, coordinate or relative distance of the obstacle can be obtained through the group module 40.

After the corresponding information of the obstacle is detected through the apparatus of the present invention, it can provide a driver with utilization or reference. For example, the apparatus for detecting an obstacle through stereovision of the present invention may further comprises a display module capable of displaying an image and indicating the relative distance of an obstacle. Otherwise, it may further comprises an alarm module capable of setting a warning distance and comparing the warning distance with the relative distance of the obstacle to generate warning information, for example, emit alarm sound to notice a driver timely for avoiding colliding with the obstacle when the obstacle is coming near.

Figure 4A:
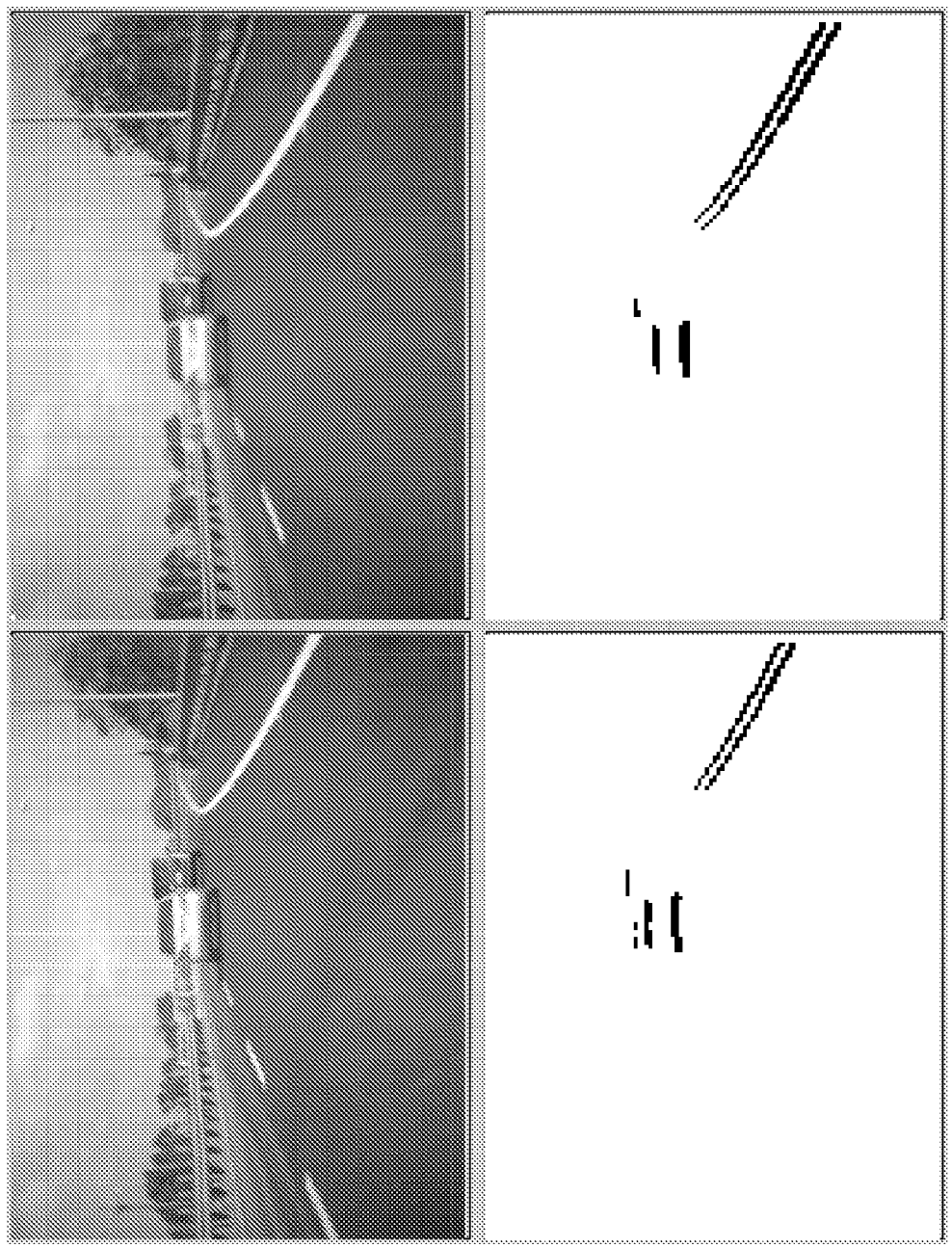
FIG. 4A is an image of horizontal edge detection
Figure 4B:
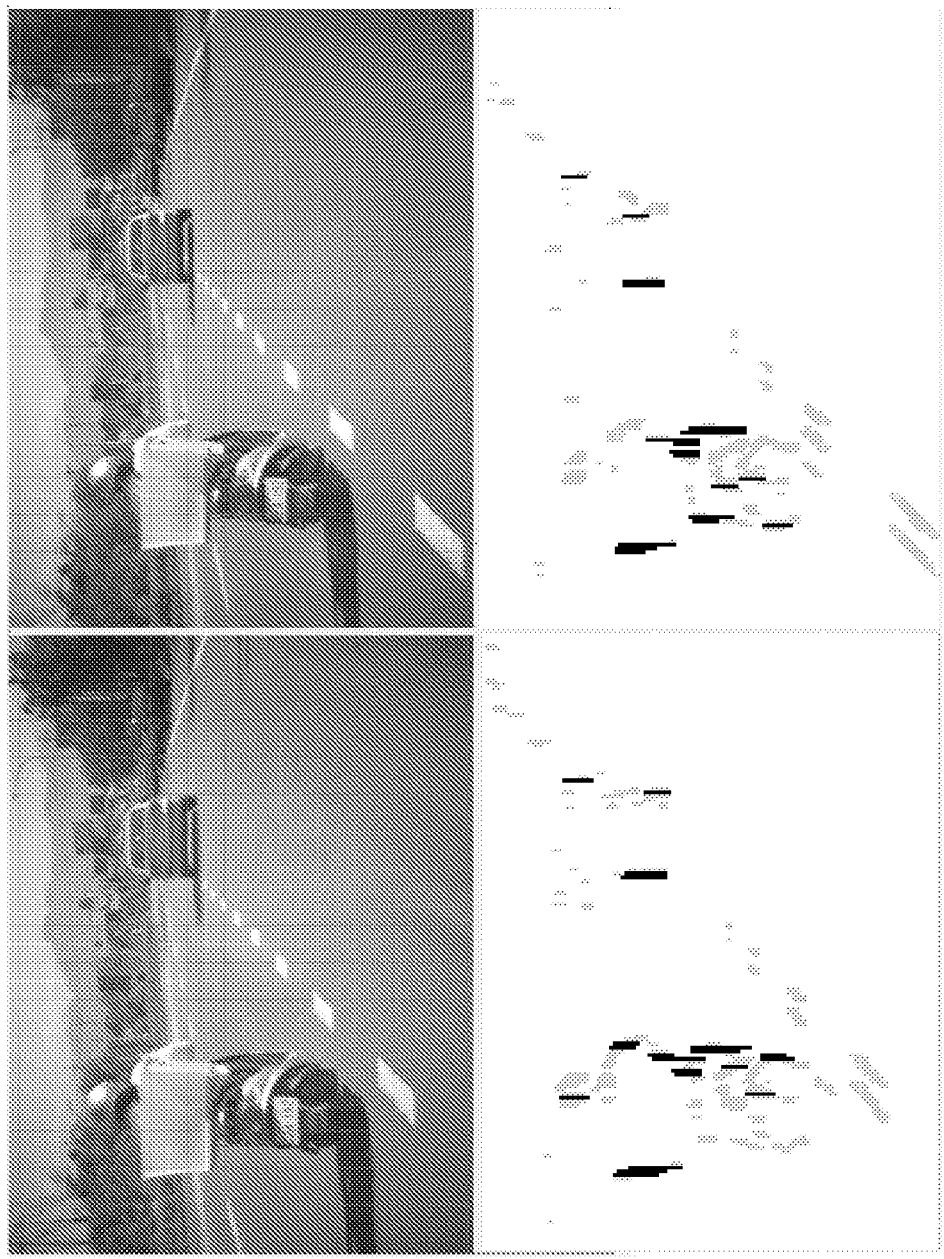
FIG. 4B is an image of vertical edge detection.
Figure 4C:
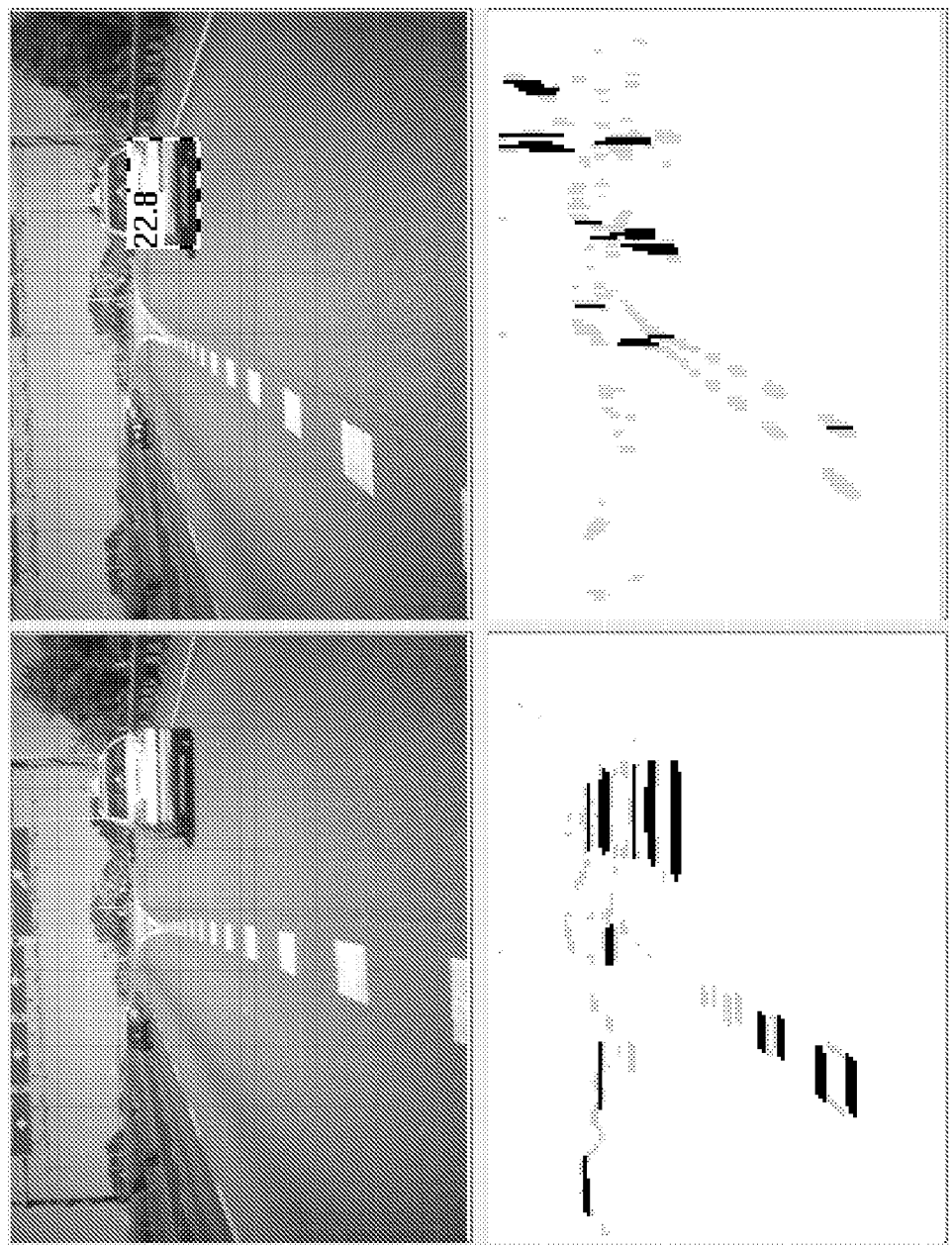
FIG. 4C is an image output of an obstacle.

Please refer to FIGS. 4A to 4C. FIGS. 4A to 4C are images captured by the apparatus for detecting an obstacle through stereovision of the present invention. Two pictures are taken as one set in the all figures; these are formed by adopting the left and right cameras as one set to capture the left and the right images simultaneously. FIG. 4A is the horizontal edge detection image. The horizontal edge detection as implied by the name is keeping the characteristics of horizontal line segments and filtering unwanted noise points; it mainly is to process detection on horizontal line segments and main detected objects thereof are vehicle, flyover, square body and etc. As a horizontal characteristic is more obvious than a vertical characteristic in scenery of natural environment and especially is vehicle. Horizontal characteristic contours from car roof line, rear wind shield, rear carriage even to body belt molding are very obvious. Outlook images are very convenient to be done as a basis for follow-up detection after they are processed through the horizontal edge detection.

As obstacles on the driving road are not only car but also passenger, motorcycle and etc, they also need to be detect and identify. Therefore, FIG. 4B is vertical edge detection image, a detection in vertical direction is adopted to assist the differentiation of an object that the horizontal characteristic thereof is not obvious. Whereby, the full detection and identification can be provided under the double and alternate testing and verification of the horizontal edge detection and the vertical edge detection.

Figure 4D:
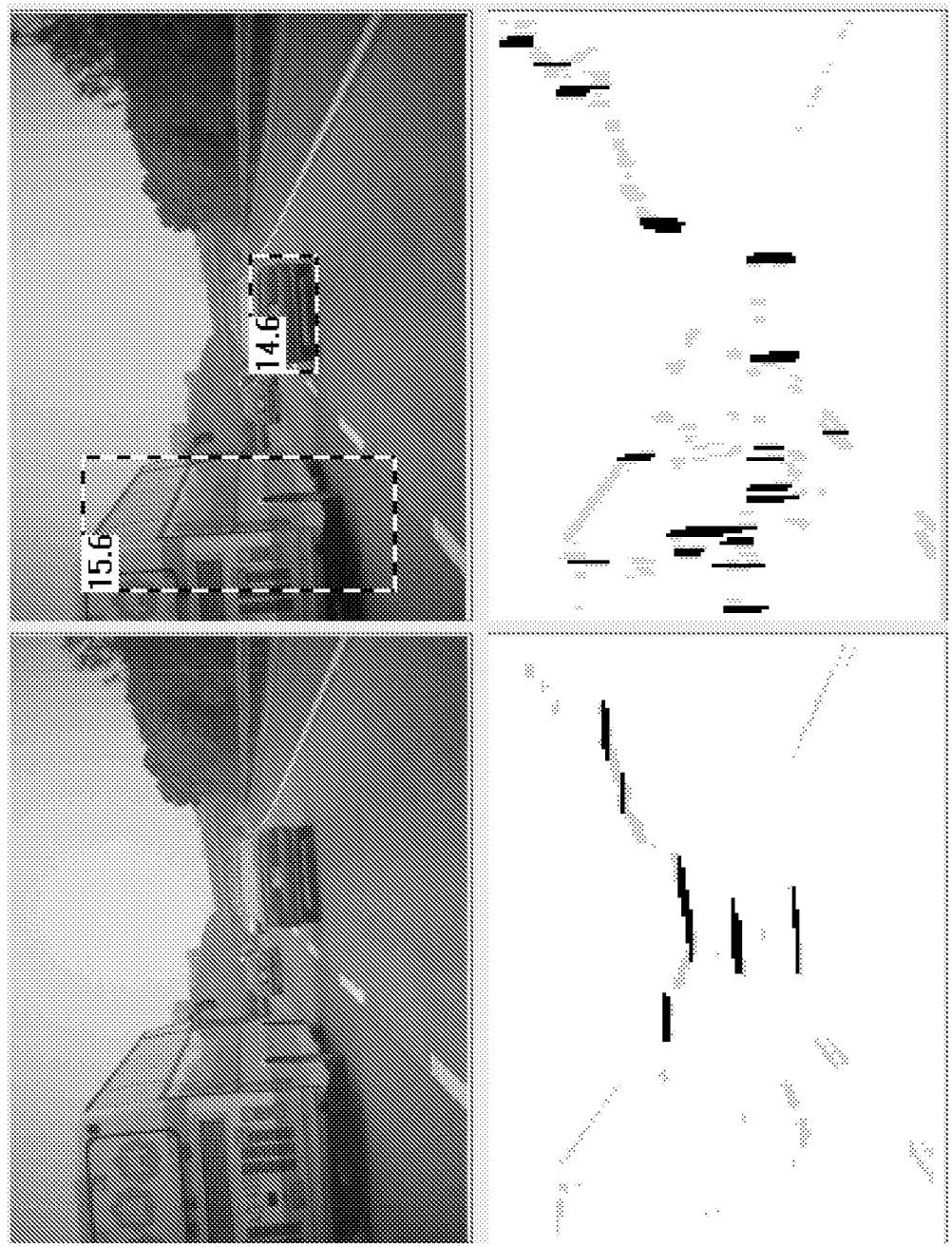
FIG. 4D is another image output of an obstacle.
Figure 4E:
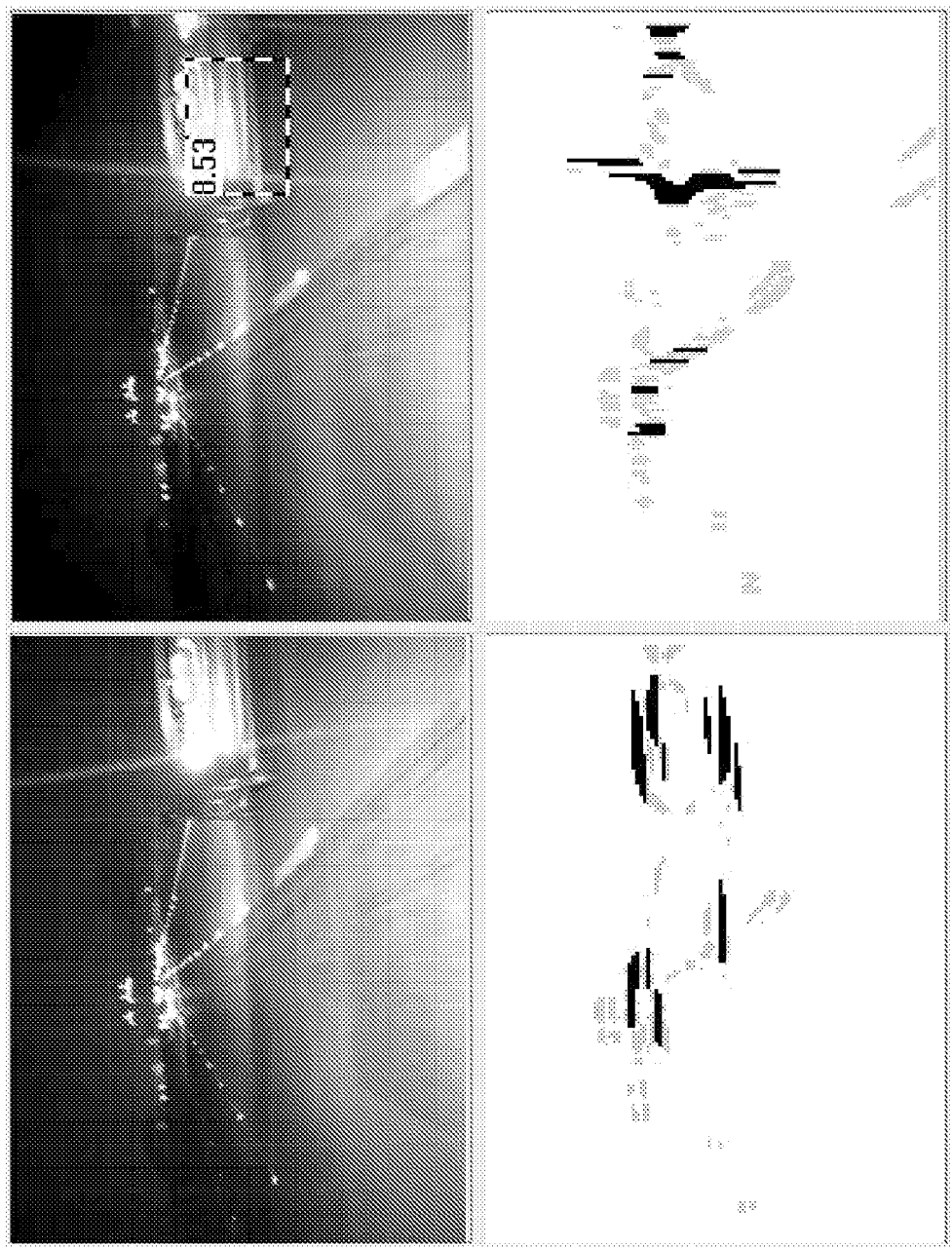
FIG. 4E is still another image output of an obstacle.

Please refer to FIGS. 4C and 4E. FIG. 4C is an image output of an obstacle. We can see from the figure that a relative obstacle distance corresponding to the obstacle in an image can be finally obtained through the device for detecting an obstacle through stereovision, and the relative distance of the obstacle is directly indicated in the image in FIG. 4C to allow a driver to take it as a reference. FIG. 4D is another image output of an obstacle in a multiple-vehicles state. Similarly, relative distances of the obstacles can respectively indicated to the multiple obstacles. FIG. 4E is still another image of an obstacle in a night state. We can see from the figure that even if it is under a night dim light condition, the apparatus for detecting an obstacle through stereovision can still detect a relative distance of the preceding obstacle and directly indicate the relative distance of the obstacle in the image.

Figure 5:
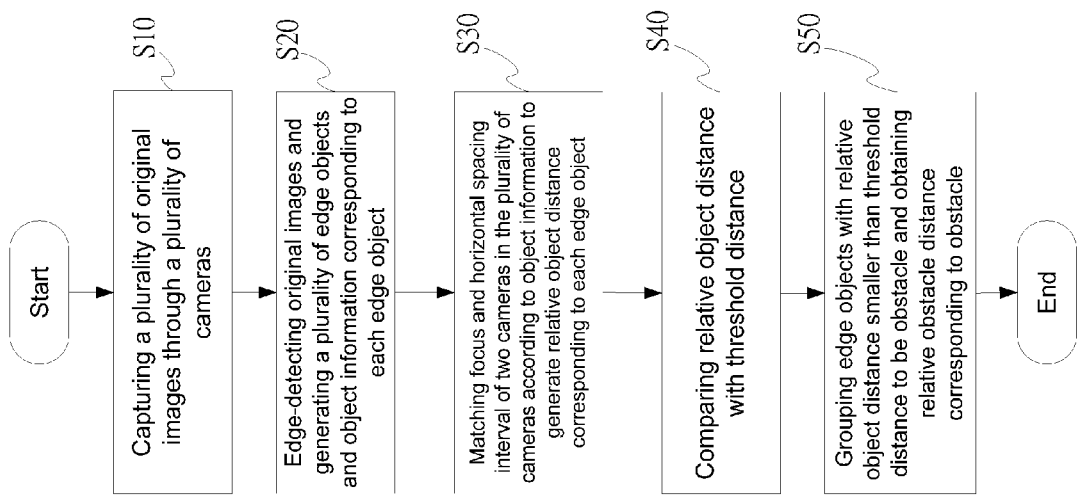
FIG. 5 is a flow chart of a method for detecting an obstacle through stereovision of the present invention.

Please refer to FIG. 5. FIG. 5 is a flow chart of a method for detecting an obstacle through stereovision of the present invention, the method comprises the following steps:

Step S10: capturing a plurality of images through a plurality of cameras; capturing images with the plurality of cameras can generate stereovision to conquer effectively drawbacks of using only one single camera.

Step S20: edge-detecting the image to generate a plurality of edge objects and object information corresponding to each edge object. The step further comprises the following step: using a decimation manner to lower the resolution of the image. Thus, the calculation amount of the follow-up processes of the image can substantially be lowered to allow relative information (distance, shape and etc) can be calculated in a real-time mode when a car is practically driven on the road and proper warning information can further be provided for a driver immediately.

Besides, step S20 may further comprises the following step: eliminating noise of the image by means of low-pass filtering wave. Next, to horizontal edge detection and vertical edge detection, it comprises the following steps: using an edge detection operator to detect the image to generate horizontal line segments in the horizontal edge detection and connecting the horizontal line segments to form a horizontal bounding box; using an edge detection operator to detect the image to generate vertical line segments in the vertical edge detection and connecting the vertical line segments to form a vertical bounding box.

Step S30: matching a focus (f) and a horizontal spacing interval (B) of two cameras in the plurality of cameras according to the object information to generate a relative object distance corresponding to each edge object. The step may further comprise the following steps: comparing the object information to generate a suspect object and searching the image according to the suspect to generate a disparity value (dx) of the edge object. Therefore, a relative distance (Z) can be obtained by means of the aforementioned formula (4):

$$Z = \frac{B \times f}{dx}.$$

Step S40: comparing the relative object distance with a threshold distance.

Step S50: grouping the edge objects with the relative object distance smaller than the threshold distance to form an obstacle and obtaining a relative obstacle distance corresponding to the obstacle.

After the relative distance of each obstacle in the image is known, the relative distance can then be used to provide a driver or car designer with follow-up utilization. For example, step 50 may further comprise the following steps: displaying the image and indicating the relative distance of the obstacle so that the driver is allowed to discern clearly what distance is away from the preceding obstacle; otherwise, setting a warning distance, comparing the warning distance with the relative obstacle distance, generating warning information so that it can prevent a driver from dozing off. That is to say, an alarm sound is emitted to notice a driver before colliding with a preceding obstacle.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed:

1. An apparatus for detecting an obstacle through stereovision, comprising:
   an image capturing module, comprising a plurality of cameras and used for capturing a plurality of images;
   an image processing module, edge-detecting the image and generating a plurality of edge objects and object information corresponding to each edge object;
   an object detection module, matching a focus (f) and a horizontal spacing interval (B) of the two cameras in the plurality of cameras and generating a relative object distance corresponding to each edge object; and
   a group module, comparing the relative object distance with a threshold distance, grouping the edge objects with the relative object distance smaller than the threshold distance to be an obstacle and obtaining a relative obstacle distance corresponding to the obstacle.

2. The apparatus for detecting an obstacle through stereovision according to claim 1, wherein the object information is selected from one of a group consisting of an object coordinate, image dot number, object length and object width of each edge object.

3. The apparatus for detecting an obstacle through stereovision according to claim 1, wherein the image processing module comprises a sampling unit used for lowering resolution of the image by means of decimation.

4. The apparatus for detecting an obstacle through stereovision according to claim 1, wherein the image processing module comprises a smoothing unit used for eliminating noise of the image by means of low-pass filtering.

5. The apparatus for detecting an obstacle through stereovision according to claim 1, wherein the image processing module comprises:
   a horizontal edge detection unit used for detecting the image to generate horizontal line segments by means of an edge detection operator; and
   a horizontal connection unit used for connecting the horizontal line segments to be a horizontal bounding box.

6. The apparatus for detecting an obstacle through stereovision according to claim 1, wherein the image processing module comprises:
   a vertical edge detection unit used for detecting the image to generate vertical line segments by means of an edge detection operator; and
   a vertical connection unit used for connecting the vertical line segments to be a vertical bounding box.

7. The apparatus for detecting an obstacle through stereovision according to claim 1, wherein the object detection module comprises:
   a comparison unit, comparing the object information to generate suspect objects; and
   a searching unit, searching the image according to the suspect object to generate a disparity value (dx) of the edge object;
   wherein, the relative object distance (Z) is obtained from a formula:

$$Z = \frac{B \times f}{dx}.$$

8. The apparatus for detecting an obstacle through stereovision according to claim 7, wherein the cameras capturing the images is asynchronous in the image capturing module.

9. The apparatus for detecting an obstacle through stereovision according to claim 1, further comprising a display module displaying the image and indicating the relative obstacle distance.

10. The apparatus for detecting an obstacle through stereovision according to claim 1, further comprising an alarm unit used for setting a warning distance and comparing the warning distance with the relative obstacle distance to generate warning information.

11. A method for detecting an obstacle through stereovision, comprising the following steps:
    (a) capturing a plurality of images through a plurality of cameras;
    (b) edge-detecting the image to generate a plurality of edge objects and object information corresponding to each edge object;
    (c) matching a focus (f) and a horizontal spacing interval (B) of the two cameras in the plurality of cameras according to the object information to generate a relative object distance corresponding to each edge object;
    (d) comparing the relative object distance with a threshold distance; and
    (e) grouping the edge objects with the relative object distance smaller than the threshold distance to be an obstacle and obtaining a relative obstacle distance corresponding to the obstacle.

12. The method for detecting an obstacle through stereovision according to claim 11, wherein the object information is selected from one of a group consisting of an object coordinate, image dot number, object length and object width of each edge object.

13. The method for detecting an obstacle through stereovision according to claim 11, wherein step (b) further comprises lowering resolution of the image by means of decimation.

14. The method for detecting an obstacle through stereovision according to claim 11, wherein step (b) further comprises eliminating noise of the image by means of low-pass filtering.

15. The method for detecting an obstacle through stereovision according to claim 11, wherein step (b) further comprises detecting the image by means of edge detection operator to generate horizontal line segments and connecting the horizontal line segments to be a horizontal bounding box.

16. The method for detecting an obstacle through stereovision according to claim 11, wherein step (b) further comprises detecting the image by means of edge detection operator to generate vertical line segments and connecting the vertical line segments to be a vertical bounding box.

17. The method for detecting an obstacle through stereovision according to claim 11, wherein step (c) further comprises the following steps:
    comparing the object information to generate a suspect object; and
    searching the image according to the suspect object to generate a disparity value (dx) of the edge object;
    wherein, the relative object distance (Z) is obtained from a formula:

$$Z = \frac{B \times f}{dx}.$$

18. The method for detecting an obstacle through stereovision according to claim 17, wherein the cameras capturing the images is asynchronous.

19. The method for detecting an obstacle through stereovision according to claim 11, further comprising displaying the image and indicating the relative obstacle distance.

20. The method for detecting an obstacle through stereovision according to claim 11, further comprising setting a warning distance and comparing the warning distance with the relative obstacle distance to generate warning information.

\* \* \* \* \*